July 23, 1935.  T. B. FLANAGAN  2,009,018

WEIGHING SCALE

Filed Jan. 29, 1929  2 Sheets-Sheet 1

INVENTOR.
Thomas B. Flanagan.

BY
Edwin P. Corbett
ATTORNEY.

July 23, 1935.  T. B. FLANAGAN  2,009,018

WEIGHING SCALE

Filed Jan. 29, 1929  2 Sheets-Sheet 2

INVENTOR.
Thomas B. Flanagan.
BY
Edwin P. Corbett
ATTORNEY.

Patented July 23, 1935

2,009,018

UNITED STATES PATENT OFFICE 2,009,018

WEIGHING SCALE

Thomas B. Flanagan, Columbus, Ohio, assignor to The Exact Weight Scale Company, Columbus, Ohio, a corporation of Ohio Application January 29, 1929, Serial No. 335,905

5 Claims. (Cl. 265—51)

My invention relates to weighing scales. It pertains, particularly, to a scale adapted for use in determining the weight of commodities in combination with a means for supporting a container in commodity receiving position. However, my invention is not limited to weighing commodities in any specific form of container or in any given amount.

The invention contemplates the provision of a weighing scale of the above type embodying numerous novel and advantageous features. Some of these features result, primarily, from the simplicity of construction of the apparatus and the minimum number of parts.

One advantageous feature of my invention resides in the fact that I have provided a scale wherein an article to be weighed may be suspended from one end of a lever and a weight indicating mechanism is disposed in such cooperative relation with said lever that the weighing operation will be facilitated by an indication, preferably visual, of the gradual approach to the point of balance in the weighing operation. By means of this feature, an operator who is filling a receptacle, such as a sack suspended from the lever may, without effort, observe the gradual approach of the lever to the point of balance by observing the indicating means and may thereby readily regulate the filling of the sack or other receptacle so as to practically obviate all danger of material over-weight at any time during the filling operation.

Another advantageous feature resides in the fact that an over and under weight indicating mechanism is provided in and forms a part of the weighing scale and such over and under weight indicating mechanism is directly connected to and operated by movement of that end of the main lever of the scale on which the known weight is disposed. This tends to increase the efficiency of the scale.

A further advantageous feature arises from the fact that means have been provided on the side of the main lever on which the known weight is ordinarily disposed in weighing operations for compensating for a greater or lesser amount of weight on the unknown weight or force side of the main lever prior to a weighing operation. This will permit the main lever of the scale to be brought to balanced position prior to a weighing operation.

Still another advantageous feature of the invention resides in the fact that a container or other commodity or receiving receptacle support is disposed on one end of the main lever and is so constructed and of such nature that the commodity receiving container or receptacle will always be in a relatively vertical position regardless of the angle of inclination of the main lever on which the support is mounted.

Various objects and other advantageous features of the invention may be seen in the following detailed description and the preferred embodiment thereof may be seen in the accompanying drawings wherein similar characters of reference designate corresponding parts and wherein.

Figure 1:
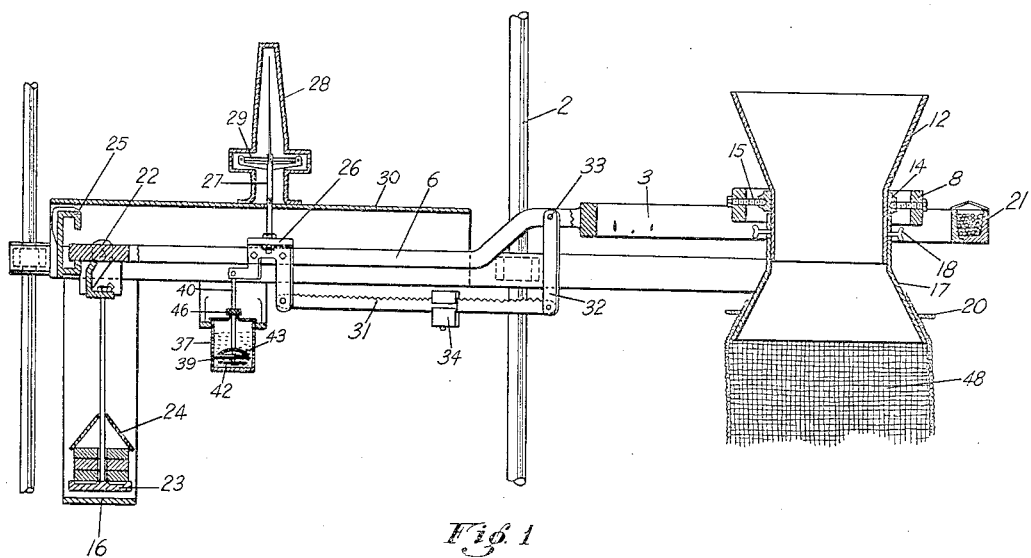
Figure 1 is a sectional view showing a scale constructed in accordance with the ideas disclosed by this invention.

Referring to the drawings, I have shown one embodiment of my invention as comprising a scale or weighing mechanism mounted on a frame. This frame preferably consists of horizontal channel members 1 supported on their opposite ends by vertically disposed rods or pillars 2 extending through pipe brackets 2' on the horizontal channel members. The vertical rods or pillars are preferably secured at or near their top and bottom ends to solid members, for instance, the floor and ceiling of a room in which the scale or weighing mechanism is located. However, my invention is not limited to any particular means or method of supporting the weighing mechanism. For instance, mechanism may be swung from an overhead support or may be supported on a single upright standard.

The supporting framework of the scale or weighing mechanism shown further consists of horizontally disposed members 3. One end of each of these members is attached to one of the channel members 1 and rigidly secured thereto by means of bolts 4. These horizontal members first diverge outwardly and then extend parallel to the channel members and have knife edge bearing supports 5 on the outermost ends thereof. The knife edge portions that are secured to the main lever 6 of the scale or weighing mechanism rest on these bearing supports thereby providing a fulcrum point for the main lever of the scale.

Figure 2:
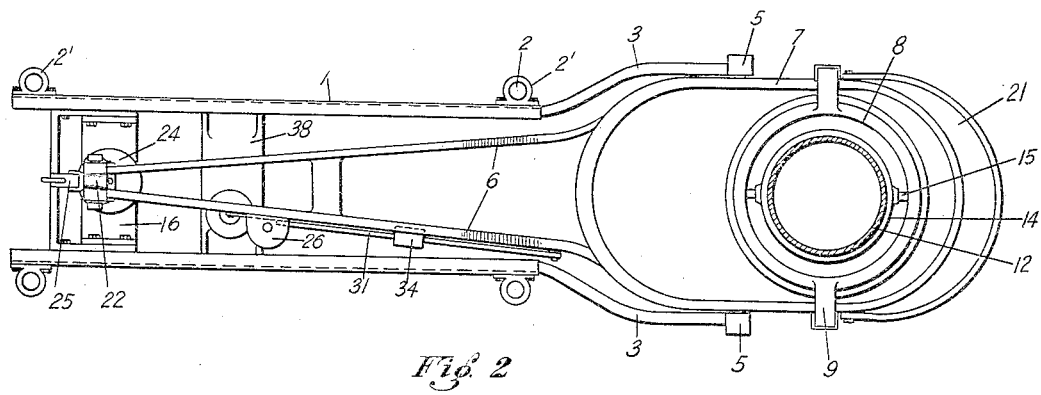
Figure 2 is a top plan view of the scale shown in Figure 1.
Figure 3:
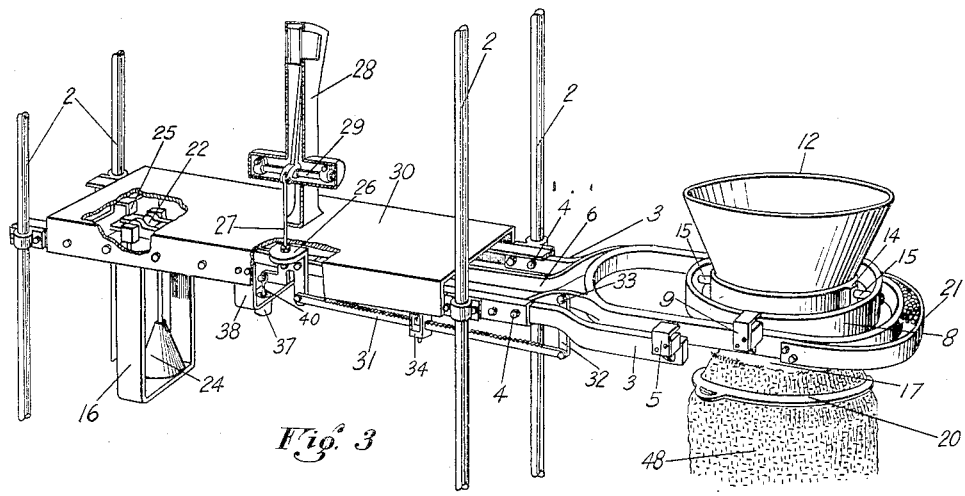
Figure 3 is a perspective view, with parts broken away, of the scale shown in Figures 1 and 2.

It will be noted, by referring to Figures 2 and 3, that the main lever 6 embodies a loop portion 7. This loop portion provides a means for pivotally mounting a sack or similar container supporting structure on the main lever. Such supporting structure comprises a ring member 8, that is preferably circular, mounted to swing within the loop portion 7 by means of knife edge bearings 9. The ring member 8 is so mounted within the loop portion 7 that it will swing in a plane parallel to the longitudinal axis of the main lever 6.

A funnel shaped member 12 that extends upwardly in a vertical direction and then flares outwardly is, in turn, disposed within the ring member 8. The member 12 preferably rests within a ring or circular piece of metal 14. The ring or circular piece of metal 14 is provided with openings for the reception of the ends of pins 15 that extend through the ring member 8. The pins 15 preferably take the form of screws so as to be adjustable.

The bearings 9 which pivotally support the ring member 8 are so disposed that the ring member may swing in a plane parallel to the longitudinal axis of the main lever 6 as hereinbefore described and the pins 15 are disposed in such position relative to the longitudinal axis of the main lever that the funnel shaped member hereinbefore described may swing in a plane perpendicular to the longitudinal axis of the main lever and perpendicular to the plane in which the sack supporting structure may swing on the bearings 9.

Figures 4, 5, 6, 7:
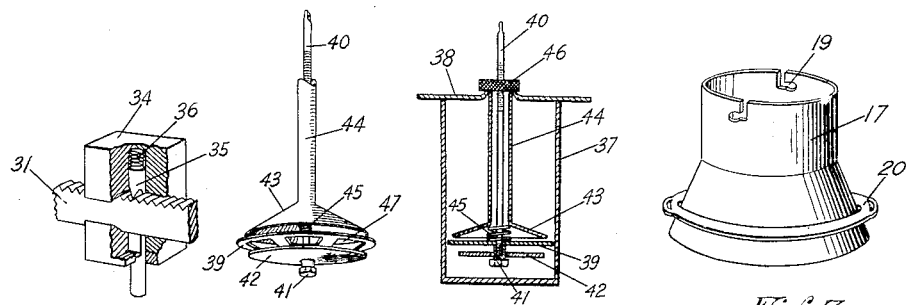
Figure 4 is a perspective view of the tare weight that provides a means for bringing the main lever to balance position and the means for locking the weight in its desired position.
Figure 5 is a perspective view of a part of the dash pot mechanism.
Figure 6 is a sectional view of the dash pot mechanism.
Figure 7 is a perspective view of the container or other receptacle support.

As shown in Figures 2, 3 and 7, a funnel shaped member 17 is also provided that is substantially similar in shape to the funnel shaped member 12. However, the cylindrical portion of this funnel shaped member 17 is slightly larger than the cylindrical portion of the funnel shaped member 12 and is adapted to fit thereover as shown best in Figure 1. The cylindrical portion of the funnel shaped member 12 is provided with outwardly extending screws or lugs 18 and the funnel shaped member 17 is provided with bayonet slots 19 which are adapted to cooperate with the screw or lug members 18 to rigidly secure the funnel shaped members together. It will be understood that the members 18 may take the form of screws to permit tightening thereof and consequent clamping of the vertical portions of the funnel shaped members together or their removal so that the funnel shaped member 12 may be lifted out of the ring 14. However, the funnel shaped member 12 may be permanently secured within the ring 14. A ring member 20 is loosely disposed over the outwardly flaring portion of the funnel structure 17 and its purpose will be hereinafter described.

The end of the main lever 6 which embodies the loop portion 7 has a shot pan 21 rigidly secured thereto, the purpose of which is well known in the art. The opposite end of the main lever is provided with a nose iron pivot structure 22 from which is suspended a counterpoise rack 23 adapted to receive various known weights. This rack is also provided with a cover 24 which is adapted to protect the known weights from dust or other foreign substance when they are disposed on the rack. It hangs in a U-shaped guard 16 which prevents excessive lateral swinging of the rack. As a means for limiting the upward and downward movement of the end of the main lever on which the nose iron pivot structure is disposed, a casting 25 which may take any desired shape is secured to the frame of the scale. In the form shown, it comprises an element C-shaped in cross-section whose fingers overlie and underlie this end of the lever.

Intermediate the nose iron end of the main lever and the fulcrum point thereof, a member 26 is secured to the main lever. This member has a horizontal portion to which is connected a steel yard rod 27 that is, in turn, operatively connected with an over and under weight indicating mechanism 28 embodying a torsion element 29. Such over and under weight indicating mechanism is shown as being mounted on a cover 30 that is supported by the horizontal members 1 of the frame. However, it will be understood that the over and under weight indicating mechanism may be supported in any desired manner.

The member 26 has two downwardly depending members and to one of these is pivotally attached a tare beam 31. At its opposite end, the tare beam 31 is pivotally attached to a link 32 which has one end connected to the main lever of the scale as at 33. A tare weight 34 is mounted on the tare beam 31 and is adapted to be secured in any desired position along the tare beam by means of a pin structure 35 that is normally forced downwardly by means of a spring 36. The pin structure is adapted to engage notches along the length of the tare beam. This tare beam and weight structure is provided in order to compensate for the variation in weight of the sacks or other containers and the variations in weight of the funnel shaped members 12 and 17 which may be of any desired size and to bring the scale main lever 6 to balanced position.

Secured to the other downwardly depending portion of the member 26 is the piston rod of a dash pot mechanism 37 which is supported by a U-shaped member 38 although it may be supported in any other manner. This dash pot structure forms an important part of this invention and consists of an outer shell in which is disposed a piston structure.

The piston structure of the dash pot 37 comprises a piston 39 and a piston rod 40. Such piston rod extends downwardly through the piston and a sleeve nut 41 is threaded thereon (Figures 5 and 6). Slidably mounted on this sleeve nut is a plate 42 whose downward movement is limited by the head of the sleeve nut and whose upward movement is limited by the piston 39. A bell shaped plate 43 having a hollow stem 44 is mounted above the piston 39 with the stem portion surrounding the piston rod 40 and extending upwardly through the top cover of the shell. This bell shaped plate 43 is normally spaced from the piston 39 by means of a spring 45 which bears against the lower surface of the plate and the upper surface of the piston and the plate is adjusted to the desired distance from the piston 39 by means of a nut 46 that is threaded on the piston rod and bears against the top of the hollow stem 44 as shown in Figure 6. The piston 39 is provided with a plurality of openings 47 as shown in Figure 5 which may take any desired shape.

In the operation of this apparatus, the shell of the dash pot is filled with a fluid, preferably oil, the piston 39 being moved upwardly and downwardly in the shell by movement of the main lever 6 of the scale to which the piston rod 40 is connected. When the piston 39 is moved upwardly, the oil or other fluid in the shell flows downwardly past the plate structure 43 and through the opening 47 to the underneath side of the piston. It will be understood that the plate structure 43 is adjusted to such distance above the piston 39 as to cause the oil or other fluid to flow through the opening 47 in the piston at the desired rate of speed.

The downward flow of the oil or other fluid through the opening 47 in the piston will force the plate 42 which is mounted on the sleeve nut 41 to its lowermost position, that is, downwardly against the head of the sleeve nut. Upward movement of the piston 39 will continue until upward movement of the one end of the main lever 6 ceases and during this upward movement the oil or other fluid in the shell will pass from the upper side of the piston to the lower side thereof past the plate structure 43, through the openings 47 in the piston 39 and past the plate 42. The plate structure 43 may be adjusted towards or from the piston 39 and thereby control the rate of passage of the oil or other fluid from one side of the piston to the other to regulate the rate of upward movement of the piston.

On downward movement of the one end of the main lever 6 and consequent downward movement of the piston 39, the oil or other fluid pressing against the under surface of the plate 42 which is loosely mounted on the sleeve nut as hereinbefore described will move this plate upwardly against the under surface of the piston 39 to either close the opening 47 entirely and force all of the oil or other fluid to pass the piston 39 between the outer circumference of the piston and the inner periphery of the walls of the shell or to close the openings 47 to such extent that the oil or other fluid will pass from one side of the piston to the other at relatively slow speed. Thus, the rate of downward movement of the piston 39 and the rate of downward movement of the one end of the main lever 6 may be controlled.

In the operation of my device in its entirety, a sack or other container 48 is disposed about the outwardly flaring portion of the funnel shaped member 17 and the ring 20 which fits loosely and slidably over such outwardly flaring portion is placed over the end of the sack or other container in the manner shown best in Figure 3. It will be apparent that downward pull on the sack or other container due to increasing weight of commodity therein will cause the sack or other container to be firmly held on the funnel shaped member 17 by a wedging action between the ring 20 and the outwardly flaring portion thereof.

The tare weight 34 is then moved along the tare beam 31 until the main lever 6 is brought to a balanced position which is ascertained by the indicator of the over and under weight mechanism being in registry with the zero mark on the indicating dial. At this time, the desired amount of known weight is placed upon the weight rack 23 which will move one end of the main lever 6 downwardly and the indicator of the over and under weight indicating mechanism to the underweight end of the indicating dial. Then a commodity is caused to flow into and through the funnel shaped members 12 and 17 and into the bag or other container 48 which is suspended therefrom. This introduction of commodity should continue until the indicator of the over and under weight indicating mechanism is again in registry with the zero mark on the indicating dial, at which point the main lever 6 of the scale will be in balanced position and the known weight elements be exactly counterbalanced by the amount of commodity in the bag or other container. The rate of upward and downward movement of the ends of the main lever is directly controlled by the dash pot mechanism hereinbefore described.

Figure 8:
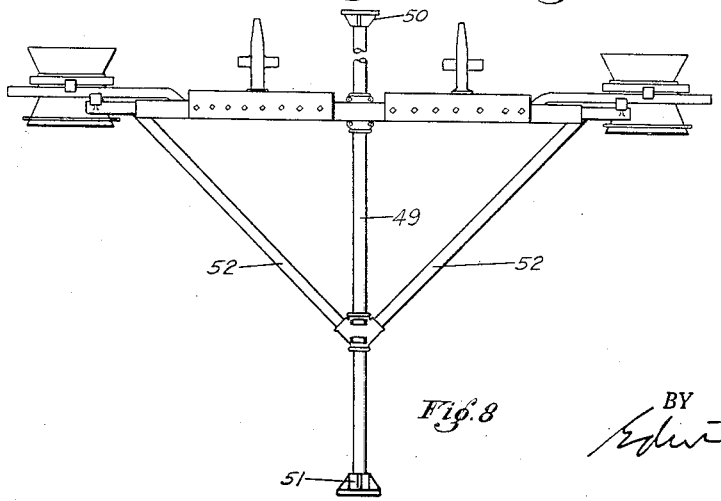
Figure 8 is a side elevation showing a modified form of the invention.

In Figure 8 of the drawings, I have shown a modified form of my invention which consists of two duplicate scales or weighing mechanisms mounted upon a single rod or support 49. This rod or support is mounted in upper and lower bearings 50 and 51 and is adapted to turn therein. The scale mechanisms are further supported by braces 52 extending diagonally from the rod or support 49 to the outer ends of the weighing mechanism. With this construction, it is possible for a workman to complete weighing operations without the necessity of stopping to remove filled containers and replace such containers with empty ones. In other words, one container may be filled while another container is being placed on the opposite weighing mechanism by another workman. When one container is filled, the weighing mechanisms may be moved to reverse positions and the filled container be taken from one weighing mechanism and replaced by an empty container while the container on the opposite weighing mechanism is being filled.

Figure 9:
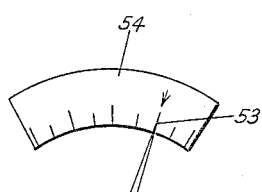
Figure 9 is a front view showing an indicator and an indicating dial.

Referring to the drawings and the preceding description, it will be seen that I have provided a scale or weighing mechanism embodying numerous advantageous features. One of these features resides in the construction of the over and under weight indicating mechanism which is such that the indicator will travel over a relatively long distance from one extremity of the indicator dial to the point indicating even balanced position of the main lever but will only move a relatively short distance from the point indicating even balanced position of the indicator to the opposite extremity of the indicating dial. The dial and indicator of such construction is shown in Figure 9 wherein the mark 53 which indicates even balanced position of the main lever 6 is relatively nearer one end of the indicating dial 54 than the other.

Such construction of the over and under weight indicating mechanism gives rise to the further advantage that the operator of the scale will have a relatively long time between the movement of the indicator from one extremity of the indicator dial to the zero mark which will permit the operator to stop the flow of commodity slowly instead of instantaneously. This advantage is further enhanced by the dash pot mechanism hereinbefore described which is of such construction that the rate of passage of the fluid from one side of the piston to the other may be so regulated as to govern the speed of upward movement of one end of the main lever and the consequent speed of movement of the indicator from one extremity of the dial to the zero mark.

Another advantageous feature of my invention resides in the fact that I have provided a scale or weighing mechanism in which a lever of the first class is employed as the main lever of the scale. Such construction obviously reduces the number of parts in the weighing mechanism and the liability of the working parts of the scale becoming out of order.

Still another advantageous feature of my invention resides in the fact that I have provided a scale embodying an over and under weight indicating mechanism directly connected to and operable by the main lever of the scale. This will increase the efficiency of the scale due to the fact that the slightest movement of the main lever will be indicated and any lost motion will be practically entirely eliminated.

Having thus described my invention, what I claim is:

1. A weighing scale of the class described comprising a support, a lever fulcrumed thereon and having its load receiving end formed in the shape of a horizontally disposed loop, a ring fulcrumed within said loop in parallelism with said lever, a cylindrical member extending vertically through said ring, a plurality of pins extending radially from said ring for supporting said cylindrical member in position, said cylindrical member having both ends open and flared outwardly, the upper end forming the hopper for receiving the load and the lower end engaging the open end of a sack, means for engaging said sack in position on said lower end, a load offsetting means pivotally suspended from the other end of said lever, and an over and under weight indicating mechanism operatively connected to said lever for indicating the weighing condition of the load.

2. In a scale of the class described, the combination with a support, of a lever fulcrumed thereon and having its load receiving end formed in the shape of a horizontally disposed loop, a load offsetting weight connected to the other end of said lever, a ring pivotally and horizontally mounted within the loop end of said lever in parallelism with said lever, a cylindrical member vertically extending through said ring and secured thereto, the upper end of said cylinder being open and flared outwardly to form a hopper and the lower end being open and flared outwardly and downwardly to receive the open end of a sack, means on said lower end of said member for securing said sack in position thereon, an over and under weight indicating mechanism, and an operating connection between said lever and said mechanism for actuating the latter in accordance with the weighing movement of said lever.

3. A weighing scale of the class described comprising in combination, a lever, means for suspending a sack from one end of said lever, said means having universal support on said lever, a load offsetting means suspended from the other end of said lever, an over and under weight indicating mechanism, said mechanism comprising a stationary chart having a larger under weight indicating area than over weight indicating area and an indicator, a bracket fixed to said lever, a connection between said bracket and said indicator, said indicator being mounted on a torsion element, said torsion element being adapted to resist movement of said lever and said indicator away from balanced position.

4. A sacking scale comprising a supporting structure, an unbalanced lever, means for suspending an article to be weighed from the short arm of said lever, means for attaching weights to the long arm of said lever, and an over and under weight indicator comprising an over and under weight chart, an indicator pointer mounted for movement in cooperative relation with said chart, and a means operatively connected to the long arm of said lever and with said indicator pointer whereby the approach to even balance position and any over weight of the article being weighed will be indicated upon said over and under weight indicator.

5. A sacking scale comprising a supporting structure, an unbalanced lever, means for suspending an article to be weighed from the short arm of said lever, means for attaching weights to the long arm of said lever, and an over and under weight indicator comprising an over and under weight chart, an indicator pointer mounted for movement in cooperative relation with said chart, a means operatively connected to the long arm of said lever and with said indicator pointer whereby the approach to even balance position and any over weight of the article being weighed will be indicated upon said over and under weight indicator, and a dashpot connected to the long arm of said lever, said dashpot being so constructed and operative as to permit free upward movement of the long arm of said lever and to check downward movement of said long arm.

THOMAS B. FLANAGAN.